Dec. 17, 1957 A. REXIUS 2,816,384
DECOY
Filed Aug. 24, 1956
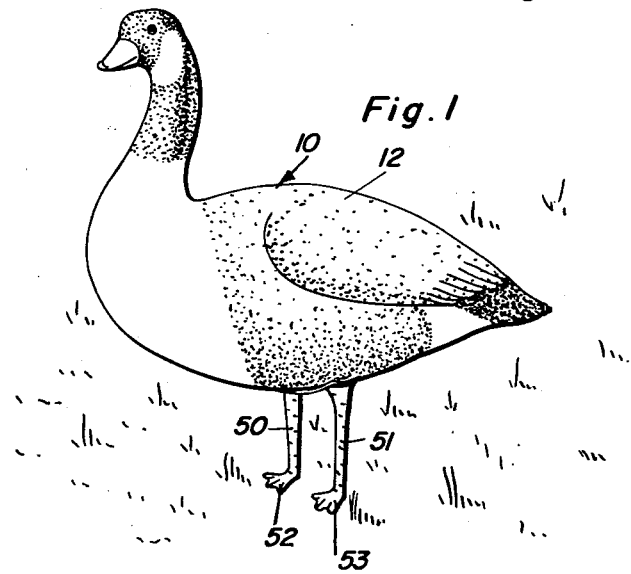
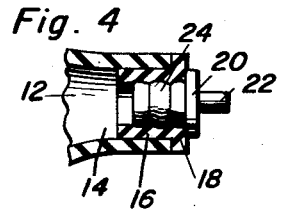
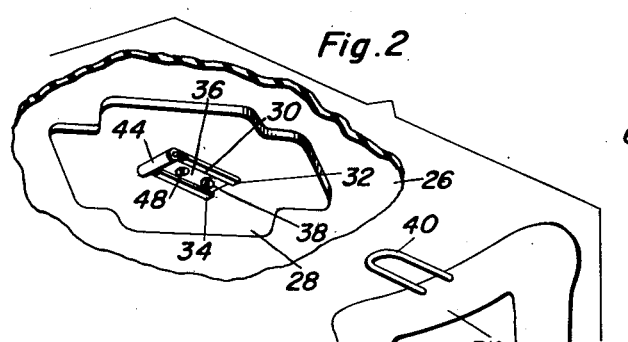
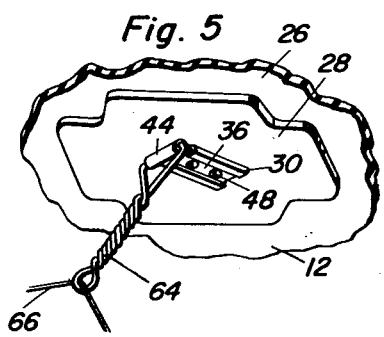
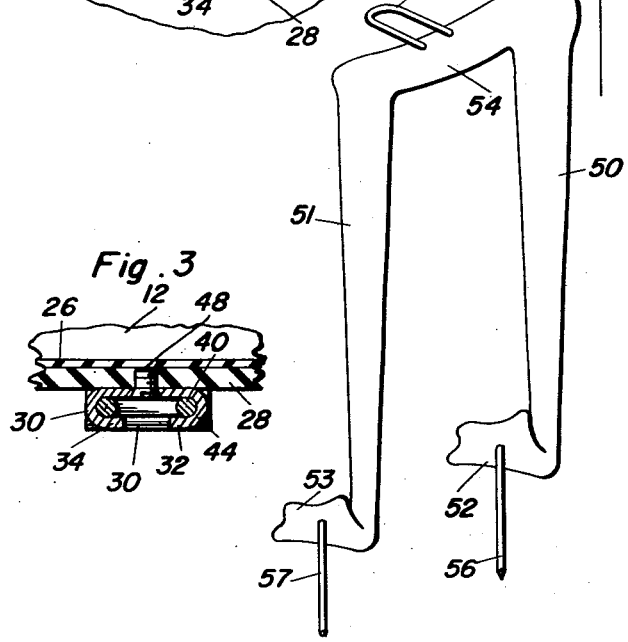
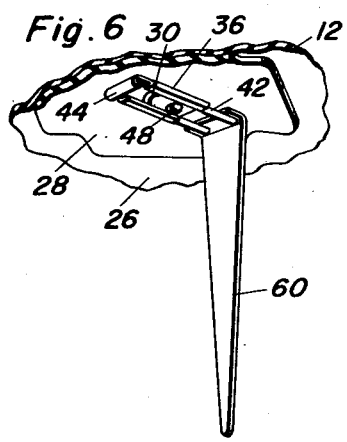
Adam Rexius
INVENTOR.

United States Patent Office 2,816,384
Patented Dec. 17, 1957

2,816,384

DECOY

Adam Rexius, Lusk, Wyo.

Application August 24, 1956, Serial No. 606,070

3 Claims. (Cl. 43—3)

This invention relates to decoys and more particularly to decoys for waterfowl.

An object of the present invention is to provide a decoy, preferably but not necessarily simulating a goose, the decoy being useful as such by waterfowl hunters and useful as lawn decorations and the like.

A further object of the invention is to provide a waterfowl decoy with detachable means to support the body thereof, the detachable means being selectively useful on land, in water or in connection with other environmental objects. The body is so constructed that when the supporting means for the body are separated therefrom, the body may rest directly on the ground or in water yielding the appearance of a goose, duck, etc., at rest.

The detachable means are demonstrated in several forms among which are the feet of the simulated waterfowl. To the best of my knowledge the detachable nature of the various supports including the feet of the decoy is new and is a distinct advantage over other decoys.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of a decoy made in accordance with the invention;

Figure 2 is an exploded perspective view of a part of the decoy body and one pair of legs that are adapted to be detachably secured to the body;

Figure 3 is a transverse sectional view showing the construction of the means connecting the legs to the body of the decoy;

Figure 4 is a longitudinal sectional view showing a plug that seals an air inlet and outlet passage for the decoy body;

Figure 5 is a fragmentary perspective view which illustrates a further type of supporting means for the body of the decoy; and Figure 6 is a perspective view showing a further modification of the means to support the decoy body.

In Figure 1 there is a decoy 10 which is constructed in accordance with the invention. This decoy has a body 12 that is preferably made of molded rubber or plastic or a substitute material that is capable of being dressed, painted or otherwise surface treated to yield an appearance that very closely approximates the actual appearance of the animal being represented, for example a goose or duck. Body 12 is hollow and is adapted to be inflated so that the decoy is easily transported, buoyant and of light weight construction. As shown in Figure 4 the aft part of the body has a passage 14 reinforced by sleeve 16, the latter being fitted in passage 14 and having shoulder 18 disposed on the extremity of the part of the body that forms passage 14. Plug 20 is separably disposed in passage 14 and more particularly, in the bore of sleeve 16. This plug is formed with a handle 22 and a plug body 24 that has an undulated surface assuring a good frictional bond between the plug and the bore of sleeve 16.

The lower part 26 of body 12 has a panel 28 fixed thereto, as by being cemented. Panel 28 supports a part of the means for detachably securing the body supporting devices to the lower part of the body. These means consist of track 30 made of a pair of inwardly opening side rails 32 and 34 connected together by a flat plate 36. The rails are generally U-shaped in cross-section and are made one piece with the plate 36. One open end 38 of the track constitutes an entrance for tongue 40 or tongue 42, while the opposite end of the track is closed by means of stop 44. The stop is formed as a continuation of plate 36 and is rolled, forming a transverse scroll having open opposite ends. Plate 36 is held in place on panel 28 by rivets, screws 48 or equivalent fasteners.

The means for supporting the body 12 may assume various configurations. The means illustrated in Figures 1 and 2 consist of a pair of legs 50 and 51 having feet 52 and 53 at their lower extremities and a cross member 54 at their upper extremities. The feet and legs are made of a material to simulate the actual legs of the decoy animal, and there are prongs 56 and 57 fixed to the feet 52 and 53, these prongs being adapted to penetrate the ground to hold the decoy erect. The attachment between the legs and the body of the decoy is made by sliding tongue 40 through entrance 38 of track 30, the tongues being made of wire and of a size that the sides thereof are squeezed together slightly as the tongue is pushed into the track. This action causes the tongue to be frictionally held in place on the decoy body.

As shown in Figure 6 tongue 42 which is identical to tongue 40, may be inserted in the track 30. The difference between Figures 2 and 6 in this particular is the single leg 60 in lieu of the pair of legs 50 and 51. Leg 60 is adapted to be inserted directly into the ground and if inserted far enough will cause the decoy to have the appearance of a goose in a sitting position.

In Figure 5 there is a further modified means to support the decoy body. These means in Figure 5 are particularly useful in connection with anchoring the decoy on water. The scroll 44 at the end of track 30 is used for wire connector 64. This wire connector facilitates the attachment of the decoy body to an anchored line 66.

In using the decoy the choice of supports for the body 12 is made in accordance with the desires of the hunter. This, in turn, will be dictated by the terrain and other considerations. When legs 50 and 51 are selected, tongue 40 is inserted in the track. The wire from which the tongue is constructed preferably continues through the cross member 54, legs 50 nad 51 and has its extremities arranged to constitute the prongs 56 and 57. This provides for a rigid, strong construction. The body of the feet and legs is preferably, but not necessarily, formed of rubber as is the body 12 of the decoy. Should a sitting position for the decoy be desired it is suggested the leg 60 be used because this can be pushed into the ground any distance in order to alter the sitting position or positions of the decoys. In water the proper choice of support means for the body of the decoy would be those of Figure 5, with the wire connector 64 being provided with a quick disconnect clamp or clip to hold the buoyant body 12 against movement beyond a reasonably small travel area.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A decoy for waterfowl, said decoy comprising a buoyant hollow body having an air inlet and outlet passage, a plug separably mounted in said passage, means to support said body, said support means including a panel fixed to the bottom of said body, a plate contacting the lower surface of said panel, inwardly opening rails along opposite edges of said plate and constituting a track, a wire tongue having sides spaced apart a distance slightly in excess of the distance across said rails so that said sides are squeezed together slightly when inserting said tongue into said track, and a stop at the inner end of said track to limit the penetration of said tongue into said track.

2. The decoy of claim 3 wherein said stop comprises a scroll secured to said plate and having open ends through which decoy supporting means are adapted to pass.

3. A combination decoy and lawn decoration comprising a buoyant hollow body in the shape of a figurine, a plate, means securing said plate to the bottom surface of said body, a pair of rails along opposite longitudinal edges of said plate, said rails opening inwardly of each other and constituting a track, a stop at the inner end of said track, a tongue which has sides that are yieldable and capable of being squeezed slightly toward each other to fit in and bind against the inner surfaces of said track thereby separably retaining said tongue in said track, said tongue adapted to accommodate a device by which the body is held captive, and said stop having an opening by which an additional decoy body holding device may be retained.

References Cited in the file of this patent
UNITED STATES PATENTS

| | | |
|---|---|---|
| 554,368 | Kunselman | Feb. 11, 1896 |
| 1,604,614 | Stoner | Oct. 26, 1926 |
| 2,237,194 | Ohnmacht | Apr. 1, 1941 |
| 2,256,616 | Johnson et al. | Sept. 23, 1941 |
| 2,311,823 | Gaskill | Feb. 23, 1943 |
| 2,639,534 | Stossel | May 26, 1953 |